United States Patent
Miller et al.

(10) Patent No.: US 10,718,267 B2
(45) Date of Patent: Jul. 21, 2020

(54) TURBINE ENGINE COOLING WITH SUBSTANTIALLY UNIFORM COOLING AIR FLOW DISTRIBUTION

(71) Applicant: Rolls-Royce Corporation, Indianapolis, IN (US)

(72) Inventors: Matthew M. Miller, Indianapolis, IN (US); Renée M. Wiley, Avon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 354 days.

(21) Appl. No.: 15/842,342

(22) Filed: Dec. 14, 2017

(65) Prior Publication Data

US 2019/0186363 A1    Jun. 20, 2019

(51) Int. Cl.
*F02C 7/18* (2006.01)
*F01D 25/14* (2006.01)
*F01D 25/12* (2006.01)
*F01D 25/24* (2006.01)

(52) U.S. Cl.
CPC ............. *F02C 7/18* (2013.01); *F01D 25/12* (2013.01); *F01D 25/14* (2013.01); *F01D 25/24* (2013.01); *F05D 2240/12* (2013.01); *F05D 2240/14* (2013.01); *F05D 2260/201* (2013.01)

(58) Field of Classification Search
CPC ...... F02C 7/18; F02C 7/12; F02C 7/20; F02C 7/06; F01D 25/12; F01D 25/14; F01D 25/24; F01D 9/065; F01D 25/26; F01D 25/162

See application file for complete search history.

(56) References Cited

U.S. PATENT DOCUMENTS

| | | | | |
|---|---|---|---|---|
| 4,841,726 A | * | 6/1989 | Burkhardt | F01D 11/24 415/116 |
| 7,712,317 B2 | | 5/2010 | Scanlon | |
| 9,188,337 B2 | * | 11/2015 | Stoia | F23R 3/005 |
| 9,447,694 B2 | * | 9/2016 | Sanchez | F02C 7/12 |
| 2006/0005546 A1 | * | 1/2006 | Orlando | F01D 9/065 60/782 |
| 2009/0000307 A1 | * | 1/2009 | Tatebayashi | F01D 9/045 60/785 |
| 2009/0232637 A1 | * | 9/2009 | Propheter-Hinckley | F01D 9/065 415/116 |
| 2013/0192267 A1 | * | 8/2013 | Sanchez | F01D 25/14 60/806 |
| 2014/0000284 A1 | * | 1/2014 | Scott | F02C 7/18 60/806 |
| 2014/0003920 A1 | * | 1/2014 | Scott | F01D 9/065 415/177 |
| 2014/0060683 A1 | | 3/2014 | Bathina | |

(Continued)

*Primary Examiner* — Eldon T Brockman
(74) *Attorney, Agent, or Firm* — Brinks Gilson & Lione

(57) ABSTRACT

Various embodiments of the present disclosure address problems associated with non-uniform flow of cooling air by providing a turbine engine including a cooling air chamber in fluid communication with a cooling air source, a turbine chamber, and multiple conduits fluidly connecting the cooling air chamber and the turbine chamber. The system is configured such that, when cooling air is flowing from a cooling air source the static pressure within the cooling fluid chamber is substantially uniform and such that the mass flow rates of cooling air through the conduits and into the turbine chamber are substantially uniform.

20 Claims, 14 Drawing Sheets

(56) References Cited

U.S. PATENT DOCUMENTS

2015/0292358 A1* 10/2015 Ronan .................... F01D 25/24
  415/110
2015/0330238 A1* 11/2015 Manzoori ................ F01D 9/06
  415/115

* cited by examiner

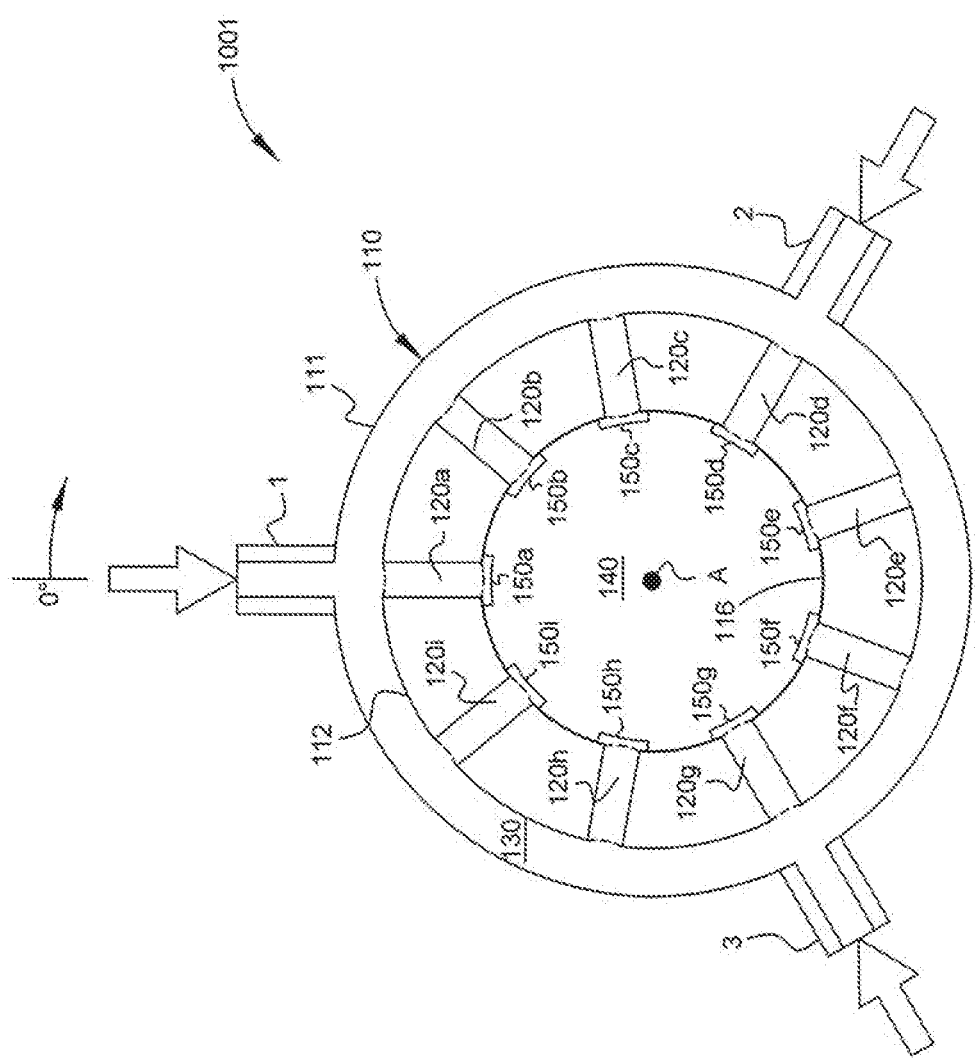

TURBINE ENGINE COOLING WITH SUBSTANTIALLY UNIFORM COOLING AIR FLOW DISTRIBUTION

CROSS REFERENCES

This application is related to and concurrently filed with co-pending U.S. patent application Ser. No. 15/842,350, filed Dec. 14, 2017, entitled "Modulated Cooling Air Control System and Method for a Turbine Engine", with named inventors Michael Grzelecki, Michael Monzella and Renée M. Wiley, and U.S. patent application Ser. No. 15/842,354, filed Dec. 14, 2017, entitled "Flow Control in Modulated Air Systems", with named inventors Michael Grzelecki, Michael Monzella and Renée M. Wiley. The entirety of each of these applications is incorporated herein by reference.

FIELD

The present disclosure relates to cooling turbine engines, and more specifically to cooling turbine engines with substantially uniform cooling air flow distribution.

BACKGROUND

FIG. 1A is a simplified partial cutaway view of a prior art gas turbofan engine 1000 (sometimes referred to as the "engine" for brevity) having a rotational axis A. The engine 1000 includes an air intake 1100, a propulsive fan 1200, an intermediate-pressure compressor 1300, a high-pressure compressor 1400, a combustor 1500, a high-pressure turbine 1600, an intermediate-pressure turbine 1700, a low-pressure turbine 1800, and an exhaust nozzle 1900. The high-pressure compressor 1400 and the high-pressure turbine 1600 are connected via a shaft 2000 and rotate together about the rotational axis A. The intermediate-pressure compressor 1300 and the intermediate-pressure turbine 1700 are connected via a shaft 2100 and rotate together about the rotational axis A. The fan 1200 and the low-pressure turbine 1800 are connected via a shaft 2200 and rotate together about the rotational axis A. A fan nacelle 2400 generally surrounds the fan 1200 and defines the air intake 1100 and a bypass duct 2300. Fan outlet guide vanes 2500 secure the fan nacelle 2400 to the core engine casing.

In operation, the fan 1200 compresses air entering the air intake 1100 to produce a bypass air flow that passes through the bypass duct 2300 to provide propulsive thrust and a core air flow into the intermediate-pressure compressor 1300. The intermediate-pressure compressor 1300 compresses the air before delivering it to the high-pressure compressor 1400. The high-pressure compressor 1400 further compresses the air and exhausts the compressed air into the combustor 1500. The combustor 1500 mixes the compressed air with fuel and ignites the fuel/compressed air mixture. The resultant hot combustion products then expand through—and thereby drive—the high-, intermediate-, and low-pressure turbines 1600, 1700, and 1800 before being exhausted through the exhaust nozzle 1900 to provide additional propulsive thrust. The high-, intermediate-, and low-pressure turbines 1600, 1700, and 1800 respectively drive the high-pressure compressor 1400, the intermediate-pressure compressor 1300, and the fan 1200 via the respective shafts 2000, 2100, and 2200.

FIG. 1B shows a simplified cross-sectional view of the engine 1000 taken along a plane perpendicular to the axis A through a nozzle guide vane assembly between the high-pressure turbine 1600 and the intermediate-pressure turbine 1700. The engine 1000 includes a turbine section casing 10 including an outer cylindrical wall 11 and an inner cylindrical wall 12 radially inward of the outer wall 11 that together define a cooling air chamber 13 there between. An inner flow path boundary wall 16 and inner cylindrical wall 12 define the inner and outer boundaries of the working fluid flow path, respectively. The inner flow path boundary wall 16 defines a turbine chamber 14. Engine shafts, rotor discs and bearings may be contained within the turbine chamber 14 and require temperature control. Multiple conduits 20a-20i are circumferentially arranged around the turbine chamber 14 and about the axis A and extend radially inwardly from respective conduit inlets on the inner cylindrical wall 12 in fluid communication with the cooling fluid chamber (manifold) 13 to respective conduit outlets on the inner flow path boundary wall 16 in fluid communication with the turbine chamber 14. The conduits 20a-20i are positioned through nozzle guide vanes (not shown) of the nozzle guide vane assembly. The cooling fluid chamber 13 is fluidically connectable to a cooling fluid source (such as the compressor stage of the engine 1000) via inlet tubes 1, 2, and 3. It is conventional in the prior art that the number of conduits is divisible by the number of inlets, or in other words the number of conduits is an integer multiple of the number of inlets. The inlet tubes 1, 2, and 3 are circumferentially spaced about the axis A.

In operation, cooling air flows from the cooling air source through the inlet tubes 1, 2, and 3 and into the cooling air chamber 13. The cooling air then flows from the cooling air chamber 13 through the conduits 20a-20i into the turbine chamber 14. The cooling air may also cool the nozzle guide vanes as it flows through the conduits 20a-20i and then cools the components in the turbine chamber 14.

The circumferential positions of the conduits 20a-20i relative to the inlet tubes 1, 2, and 3 and the fact that the conduits 20a-20i are identical causes non-uniform flow distribution in the cooling air chamber 13 and through the conduits 20a-20i. In other words, the mass flow rates of the cooling air through the respective conduits 20a-20i are not substantially uniform. FIG. 1C is a graph showing the mass flow rate distribution (curve F) and the static pressure distribution (curve P) of the cooling air in the cooling air chamber 13 relative to the circumferential angle about the axis A. Generally, the mass flow rate increases and the static pressure decreases when based on increasing proximity to one of the inlet tubes 1, 2, and 3 is located, and vice-versa.

This non-uniform flow distribution can cause temperature variations within the turbine section casing 10 that can lead to components cracking or overheating. It can also cause non-uniform turbine section casing growth that could affect the spacing between the tips of the turbine blades and the inner wall 12 of the turbine section casing 10. Non-uniform flow distribution can also lead to insufficient cooling of certain nozzle guide vanes due to less cooling air flow through their respective conduits. This can result in nozzle guide vane burn through, i.e., hole formation in the nozzle guide vanes which disrupts flow and introduces cooler air into the working fluid and thus decreasing the efficiency of the engine. Non-uniform flow distribution can also lead to uneven heat pickup from the gas path to the cooling air as it passes through the nozzle guide vane, leading to an uneven temperature distribution within the turbine chamber 14.

SUMMARY

Various embodiments of the present disclosure solve these problems by providing a turbine engine including a cooling air chamber in fluid communication with a cooling air source, a turbine chamber, and multiple conduits fluidly connecting the cooling air chamber and the turbine chamber, configured such that, when cooling air is flowing from a cooling air source the static pressure within the cooling fluid chamber is substantially uniform and such that the mass flow rates of cooling air through the conduits and into the turbine chamber are substantially uniform.

The current subject matter according to an embodiment includes a turbine engine having a cooling air source; a manifold within a turbine engine casing; and one or more inlets fluidly connecting the cooling air source to the manifold. The turbine engine further includes a turbine chamber radially displaced from the casing; and a plurality of conduits circumferentially arranged and extending radially inward from the manifold to the turbine chamber fluidly connecting the manifold with the turbine chamber; each of the plurality of conduits having a conduit inlet at the manifold and a conduit outlet at the turbine chamber. The engine further includes a first passage defined at least in part by a first conduit of the plurality of conduits is restricted relative to second passage defined at least in part by a second conduit of the plurality of conduits as a function of the respective proximity of the first and second conduits to the one or more inlets.

Another embodiment of the current subject manner includes a turbine engine including a cooling air source; a manifold defined within a turbine engine casing; one or more inlets fluidly connecting the cooling air source to the manifold; a turbine chamber radially displaced from the engine casing; and a plurality of conduits circumferentially arranged and extending radially inward from the manifold to the turbine chamber fluidly connecting the manifold with the turbine chamber. The manifold including a baffle defining a first chamber and second chamber, the first chamber in direct fluid communication with the one or more inlets and the second chamber in direct fluid communication with the plurality of conduits wherein cooling air supplied via the one or more inlets flows from the first chamber to the second chamber and through the plurality of conduits into the turbine chamber, wherein the baffle restricts flow from the first chamber to the second chamber.

A further embodiment of the current subject matter includes in a turbine engine cooling system defining a cooling air flow path from a cooling air source through an inlet into a manifold defined by the turbine casing and through a plurality of conduits extending radially inward from the manifold to a central chamber, wherein the central chamber defines a high temperature environment, a method of increasing the static pressure of the cooling air in the manifold to provide uniform flow through the plurality of conduits. The method including supplying cooling air from the cooling source into the manifold and impeding the flow of the cooling air through at least a first conduit of the plurality of conduits as a function of relative proximity of the first conduit to the inlet, compared to a second conduit of the plurality of conduits, thereby increasing the static pressure in the manifold and providing uniform flow.

BRIEF DESCRIPTION OF THE FIGURES

FIG. 2A is a simplified cross-sectional view of one example embodiment of a gas turbine engine of the present disclosure.

DETAILED DESCRIPTION

Figure 1A:
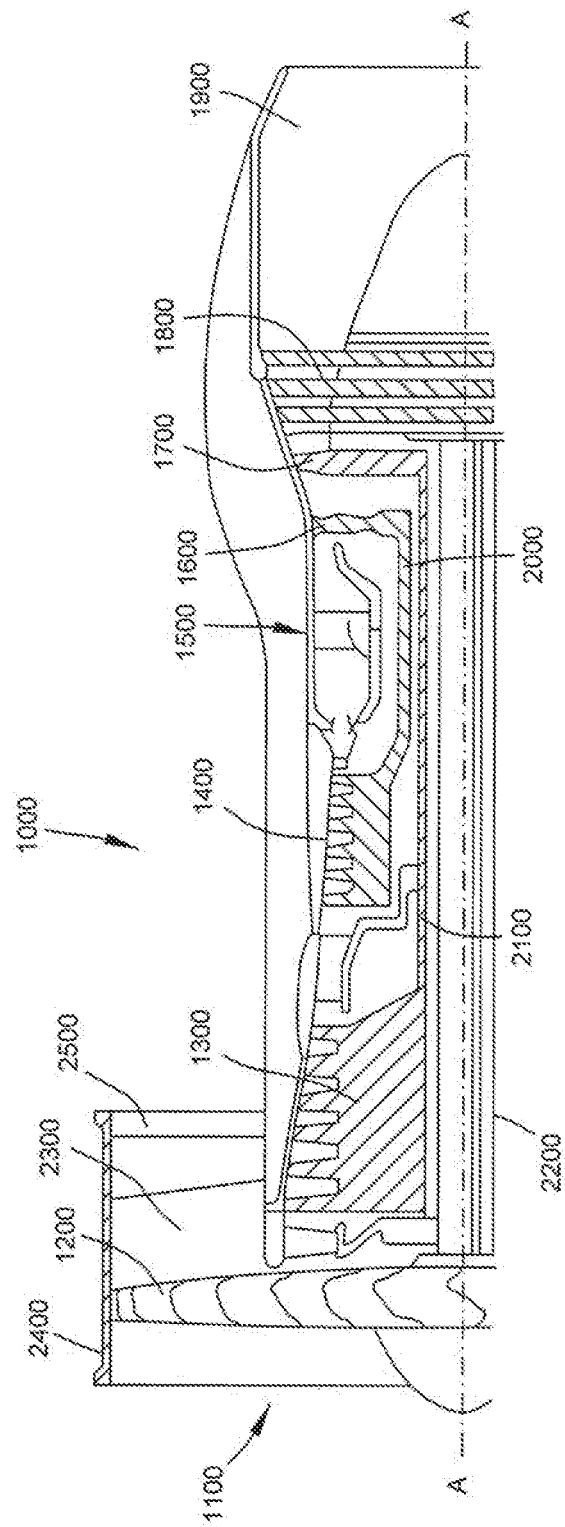
FIG. 1A is a simplified partial cutaway view of one example embodiment of a gas turbine engine of the present disclosure.
Figure 1B:
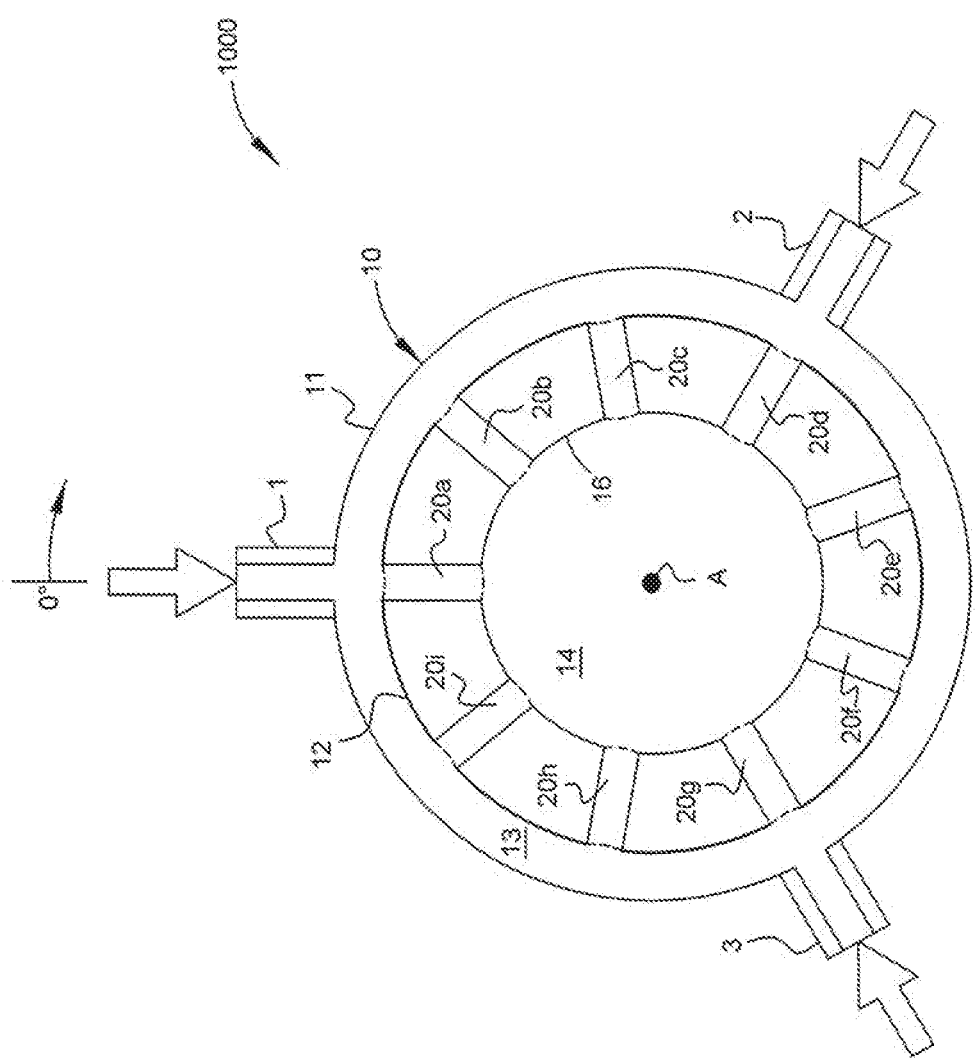
FIG. 1B is a simplified cross-sectional view of the engine of FIG. 1A.
Figure 1C:
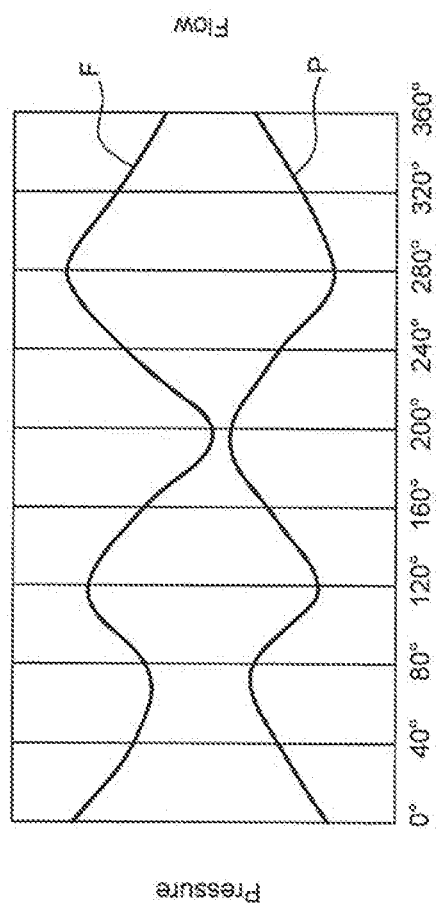
FIG. 1C is a graph showing the mass flow rate distribution and the static pressure distribution of the cooling air in the cooling air chamber of the engine of FIG. 1A.

While the features, methods, devices, and systems described herein may be embodied in various forms, the drawings show and the detailed description describes some exemplary and non-limiting embodiments. Not all of the components shown and described in the drawings and the detailed descriptions may be required, and some implementations may include additional, different, or fewer components from those expressly shown and described. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

As used herein, "downstream" means in the direction of air flow, and "upstream" means opposite the direction of airflow.

The cross sections of the gas turbine engines 1001, 1002, 1003 and 1004 represent different embodiments of the disclosed subject matter; the gas turbine engines 1001, 1002, 1003 and 1004 include components similar to those in the engine 1000 that is shown in FIG. 1A and described above.

FIG. 2A shows a simplified cross-sectional view of a gas turbine engine 1001 taken along a plane perpendicular to the axis A through a nozzle guide vane assembly between a high-pressure turbine and an intermediate-pressure turbine. The engine 1001 includes a turbine section casing 100 including an outer cylindrical wall 111 and an inner cylindrical wall 112 radially inward of the outer wall 111 that together define a cooling air chamber 130 there between. An inner flow path boundary wall 116 and inner cylindrical wall 112 define the inner and outer boundaries of the working fluid flow path, respectively. The inner flow path boundary wall 116 defines a turbine chamber 140. Multiple conduits 120a-120i (though any suitable quantity of conduits may be employed) are circumferentially arranged around the turbine chamber 140 and about the axis A and extend radially inwardly from respective conduit inlets on the inner cylindrical wall 112 in fluid communication with the cooling fluid chamber 130 to respective conduit outlets on the inner flow path boundary wall 116 in fluid communication with the turbine chamber 140. The conduits 120a-120i are positioned through nozzle guide vanes (not shown) of the nozzle guide vane assembly. The cooling fluid chamber 130 is fluidically connectable to a cooling fluid source (such as the compressor stage of the engine 1001) via inlet tubes 1, 2, and 3 (though any suitable quantity of inlet tubes may be employed). The inlet tubes 1, 2, and 3 are generally in a uniform distribution circumferentially about the axis A, however, with the implementation of the disclosed subject matter a non uniform distribution is envisioned without the attendant deleterious effects discussed previously.

Figure 2B:
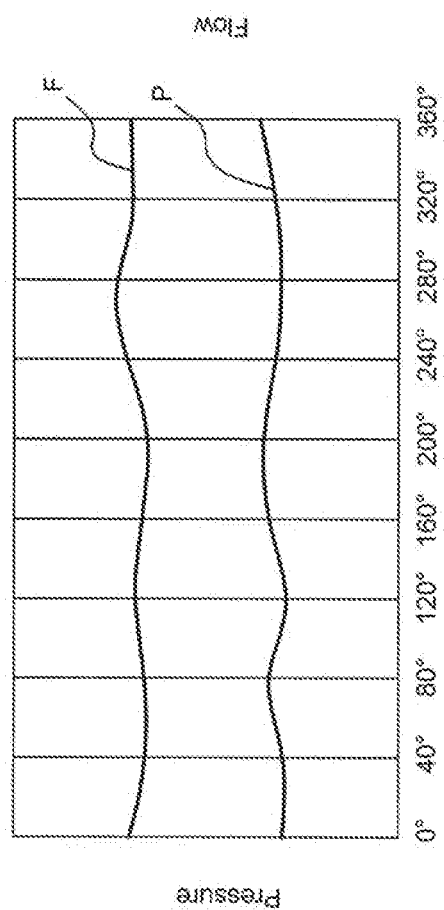
FIG. 2B is a graph showing the mass flow rate distribution and the static pressure distribution of the cooling air in the cooling air chamber of the engine of FIG. 2A.
Figure 2C:
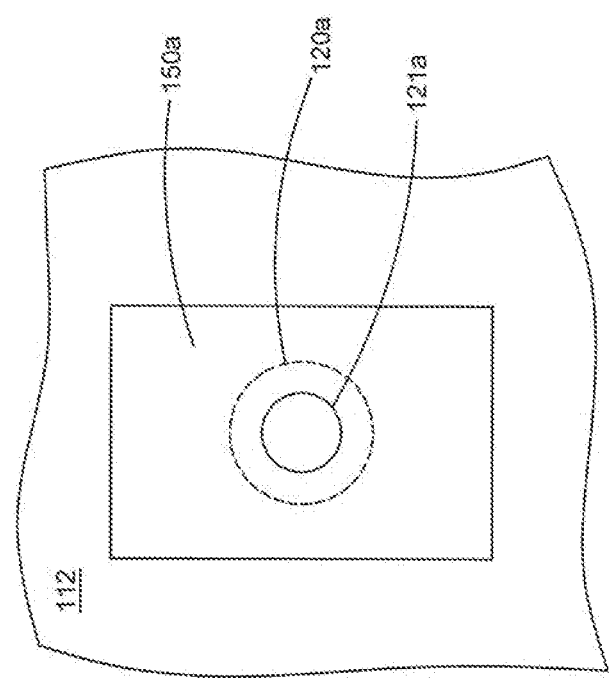
FIG. 2C shows one of the flow restrictors and one of the conduits of the engine of FIG. 2A.
Figure 2D:
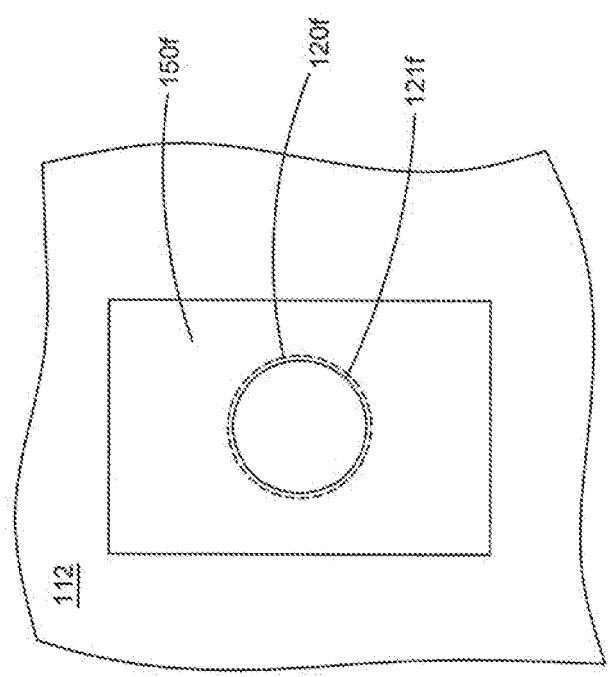
FIG. 2D illustrates another of the flow restrictors and another conduit of the engine of FIG. 2A.

The engine 1001 also includes multiple flow restrictors 150a-150i positioned adjacent the conduit outlets of the conduits 120a-120i, respectively. In this example embodiment, as shown in FIG. 2C, each flow restrictor 150 comprises a plate defining an opening (orifice) 121a-121i there through (though other suitable components may be employed). The flow restrictors 150a-150i are positioned relative to the conduit outlets of the conduits 120a-120i such that when the cooling air is flowing the static pressure within the cooling fluid chamber 130 is substantially uniform and such that the mass flow rates of cooling air through the conduits 120a-120i and into the turbine chamber 140 are substantially uniform. To achieve this, the flow restrictors of conduits positioned in close proximity to the inlet tubes are positioned to restrict more of the conduit outlet than are the flow restrictors of conduits positioned relatively far from the inlet tubes. FIG. 2C is an example of an opening 121a on a flow restrictor 150a for conduit 120a which is proximate inlet 1, whereas FIG. 2D is an example of the opening 121f on a flow restrictor 150f for conduit 120f which is the farthest away from any of the inlets 1, 2 or 3. The smaller the opening 121, (the less the cross sectional area of the orifice) the more the flow of cooling air entering and thus exiting the conduit outlet is restricted (as is the mass flow rate of cooling air through that conduit).

In operation, cooling air flows from the cooling air source through the inlet tubes 1, 2, and 3 and into the cooling air chamber 130. The cooling air chamber 130 serves as a manifold to the conduits. The cooling air then flows from the cooling air chamber 130 through the conduits 120a-120i through the respective flow restrictors 150a-150i and exits into the turbine chamber 140. The cooling air cools the nozzle guide vanes as it flows through the conduits 120a-120i and then cools the components in the turbine chamber 140. FIG. 2B is a graph showing the mass flow rate distribution (curve F) and the static pressure distribution (curve P) of the cooling air in the cooling air chamber 130 relative to the circumferential angle about the axis A. The mass flow rate and the static pressure are substantially uniform.

Another benefit of positioning the flow restrictors adjacent the conduit outlets is an increase in the static pressure inside of the conduits themselves. This assists in protecting the nozzle guide vanes from burn through.

While the flow restrictors are shown as individual components, in other embodiments the flow restrictors are integrally formed into a single component defining multiple openings. In certain embodiments, that single component is movable axially or circumferentially via a suitable actuator (such as a motor) to change the relative positions of the openings and the conduit exits.

In certain embodiments, one or more conduits may not have a flow restrictor. For example, as shown in FIG. 2D, the use of a flow restrictor 150f for conduit 120f could be eliminated given that the opening 121f is the same size and the outlet to the conduit 120f.

Figure 3A:
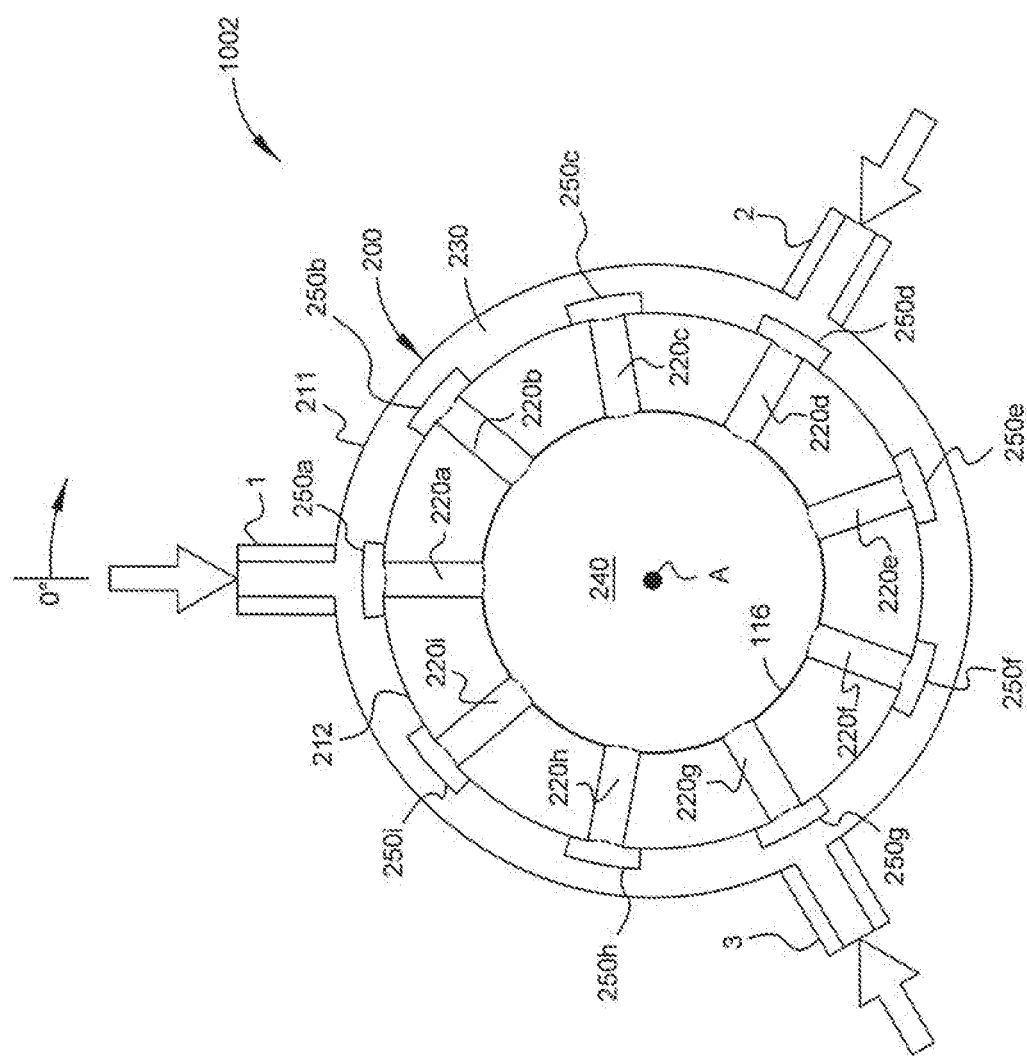
FIG. 3A is a simplified cross-sectional view of another example embodiment of a gas turbine engine of the present disclosure.

FIG. 3A shows a simplified cross-sectional view of a turbofan gas turbine engine 1002 taken along a plane perpendicular to the axis A through a nozzle guide vane assembly between a high-pressure turbine and an intermediate-pressure turbine. The engine 1002 includes a turbine section casing 200 including an outer cylindrical wall 211 and an inner cylindrical wall 212 radially inward of the outer wall 211 that together define a cooling air chamber 230 there between. An inner flow path boundary wall 216 and inner cylindrical wall 212 define the inner and outer boundaries of the working fluid flow path, respectively. The inner flow path boundary wall 216 defines a turbine chamber 240. Multiple conduits 220a-220i (though any suitable quantity of conduits may be employed) are circumferentially arranged around the turbine chamber 240 and about the axis A and extend radially inwardly from respective conduit inlets on the inner cylindrical wall 212 in fluid communication with the cooling fluid chamber 230 to respective conduit outlets on the inner flow path boundary wall 216 in fluid communication with the turbine chamber 240. The conduits 220a-220i are positioned through nozzle guide vanes (not shown) of the nozzle guide vane assembly. The cooling fluid chamber 230 is fluidically connectable to a cooling fluid source (such as the compressor stage of the engine 1002) via inlet tubes 1, 2, and 3 (though any suitable quantity of inlet tubes may be employed). The inlet tubes 1, 2, and 3 are circumferentially spaced about the axis A.

Figure 3B:
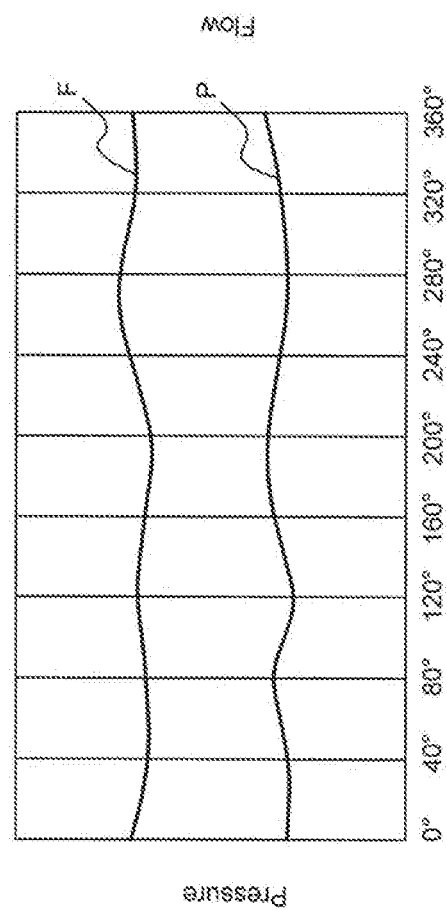
FIG. 3B is a graph showing the mass flow rate distribution and the static pressure distribution of the cooling air in the cooling air chamber of the engine of FIG. 3A.
Figure 3C:
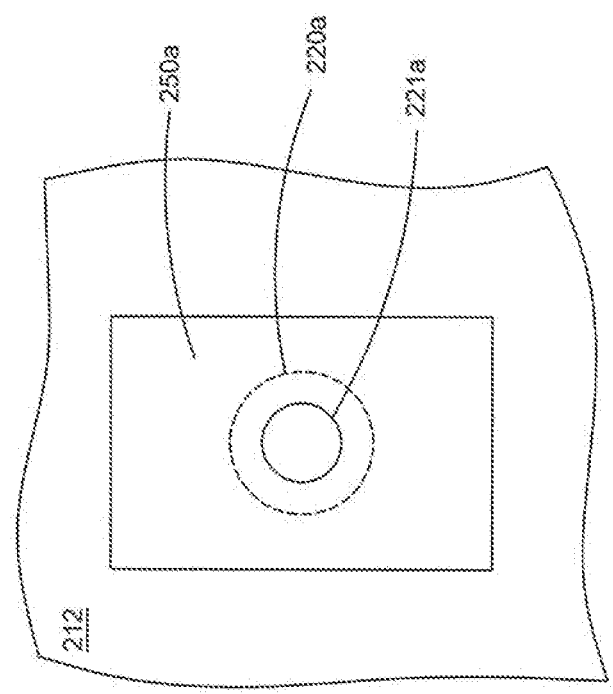
FIG. 3C shows one of the flow restrictors and one of the conduits of the engine of FIG. 3A.

The engine 1002 also includes multiple flow restrictors 250a-250i positioned adjacent the conduit inlets of the conduits 220a-220i, respectively. In this example embodiment, as shown in FIG. 3C, each flow restrictor 250 comprises a plate defining an opening 221a-221i there through (though other suitable components may be employed). The flow restrictors 250a-250i are positioned relative to the conduit inlets of the conduits 220a-220i such that when the cooling air is flowing the static pressure within the cooling fluid chamber 230 is substantially uniform and such that the mass flow rates of cooling air through the conduits 220a-220i and into the turbine chamber 240 are substantially uniform. To achieve this, the flow restrictors of conduits positioned in close proximity to the inlet tubes are positioned to restrict more of the conduit inlet than are the flow restrictors of conduits positioned relatively far from the inlet tubes. FIG. 3C is an example of an opening 221a on a flow restrictor 250a for conduit 220a which is proximate inlet 1, whereas FIG. 3D is an example of the opening 221f on a flow restrictor 250f for conduit 220f which is the farthest away from any of the inlets 1, 2 or 3. The smaller the opening 221, the more the flow of cooling air entering and exiting the conduit outlet is restricted (as is the mass flow rate of cooling air through that conduit).

In operation, cooling air flows from the cooling air source through the inlet tubes 1, 2, and 3 and into the cooling air chamber 230. The cooling air then flows from the cooling air chamber 230 and through the flow restrictors 250a-250i and into the conduits 220a-220i, and exits through the conduit into the turbine chamber 240. The cooling air cools the nozzle guide vanes as it flows through the conduits 220a-220i and then cools the components in the turbine chamber 240. FIG. 3B is a graph showing the mass flow rate distribution (curve F) and the static pressure distribution (curve P) of the cooling air in the cooling air chamber 230 relative to the circumferential angle about the axis A. The mass flow rate and the static pressure are substantially uniform.

As discussed above, while the flow restrictors are shown as individual components, in other embodiments the flow restrictors are integrally formed into a single component defining multiple openings. In certain embodiments, that single component is movable axially or circumferentially via a suitable actuator (such as a motor) to change the relative positions of the openings and the conduit inlets.

As discussed above with respect to FIG. 2D, in certain embodiments, one or more conduits does not have a respective flow restrictor.

Figure 4A:
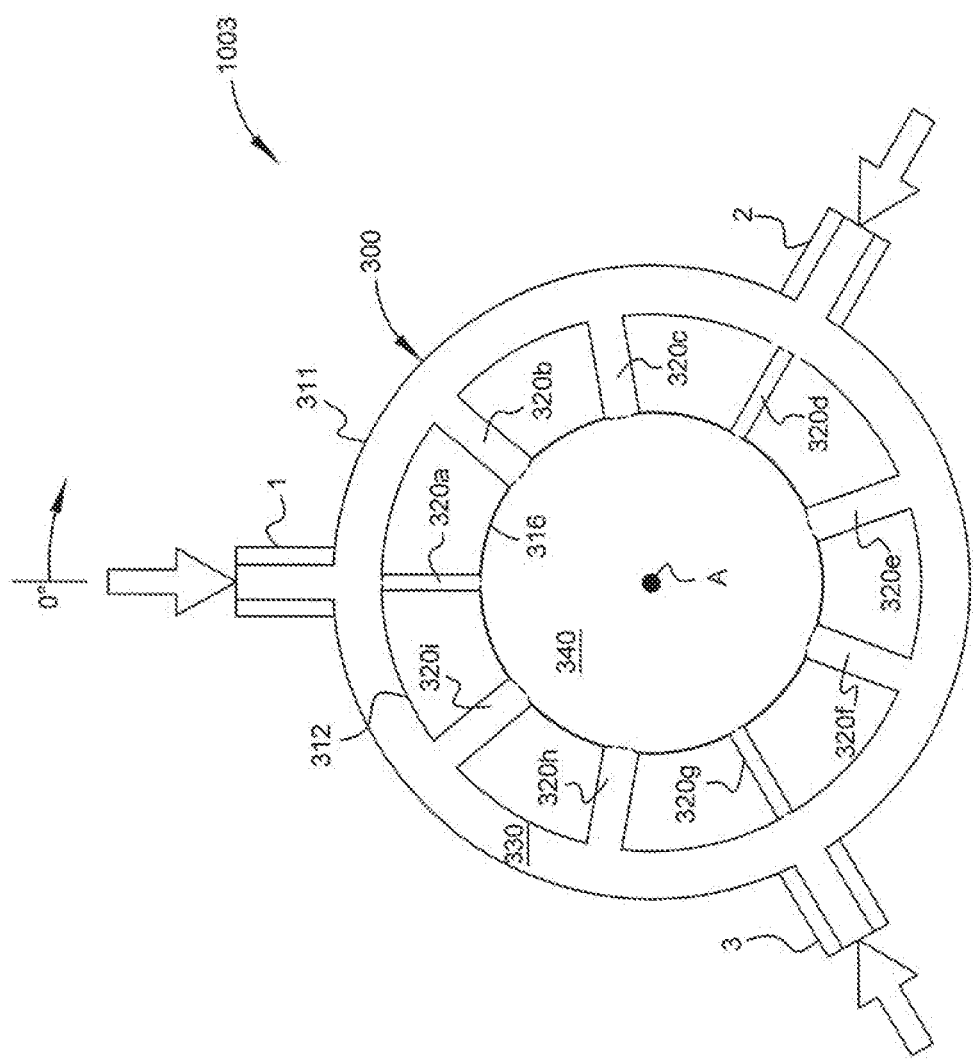
FIG. 4A is a simplified cross-sectional view of another example embodiment of a gas turbine engine of the present disclosure.

FIG. 4A shows a simplified cross-sectional view of a gas turbine engine 1003 taken along a plane perpendicular to the axis A through a nozzle guide vane assembly between a high-pressure turbine and an intermediate-pressure turbine. The engine 1003 includes a turbine section casing 300 including an outer cylindrical wall 311 and an inner cylindrical wall 312 radially inward of the outer wall 311 that together define a cooling air chamber 330 there between. An inner flow path boundary wall 316 and inner cylindrical wall 312 define the inner and outer boundaries of the working fluid flow path, respectively. The inner flow path boundary wall 316 defines a turbine chamber 340. Multiple conduits 320a-320i (though any suitable quantity of conduits may be employed) are circumferentially arranged around the turbine chamber 340 and about the axis A and extend radially inwardly from respective conduit inlets on the inner cylindrical wall 312 in fluid communication with the cooling fluid chamber 330 to respective conduit outlets on the inner flow path boundary wall 316 in fluid communication with the turbine chamber 340. The conduits 320a-320i are positioned through nozzle guide vanes (not shown) of the nozzle guide vane assembly. The cooling fluid chamber 330 is fluidically connectable to a cooling fluid source (such as the compressor stage of the engine 1003) via inlet tubes 1, 2, and 3 (though any suitable quantity of inlet tubes may be employed). The inlet tubes 1, 2, and 3 are generally in a uniform distribution circumferentially about the axis A.

The conduits 320a-320i unlike the embodiments shown in FIG. 2A and 3A are sized and shaped such that when the cooling air is flowing the static pressure within the cooling fluid chamber 330 is substantially uniform and such that the mass flow rates of cooling air through the conduits 320a-320i and into the turbine chamber 340 are substantially uniform. To achieve this, similar to the sizing of the openings in FIGS. 2C, 2D and 3C, the cross-sectional areas of the conduits 320a-320i vary based on their relative proximity (circumferentially) to the inlet tubes 1, 2, and 3. For instance, conduits relatively close to the inlet tubes have smaller cross-sectional areas than conduits relatively far from the inlet tubes. For example, in FIG. 4A the cross sectional area of conduit 320a which is proximate inlet 1, is relatively small compared with the cross sectional area of conduit 320f which is the farthest away from any of the inlets 1, 2 or 3. In addition to size restrictions, the shape of the respective conduits may also be manipulated to achieve uniform flow. For example, those conduits relatively proximate to the inlets may include bends, baffles or other impediments to flow, in order to create a uniform static pressure distribution, while those further away may be straight and without impediments. The interior surface of the conduits may also be treated with varying roughness in order to equalize the static pressure throughout the manifold 330.

Figure 4B:
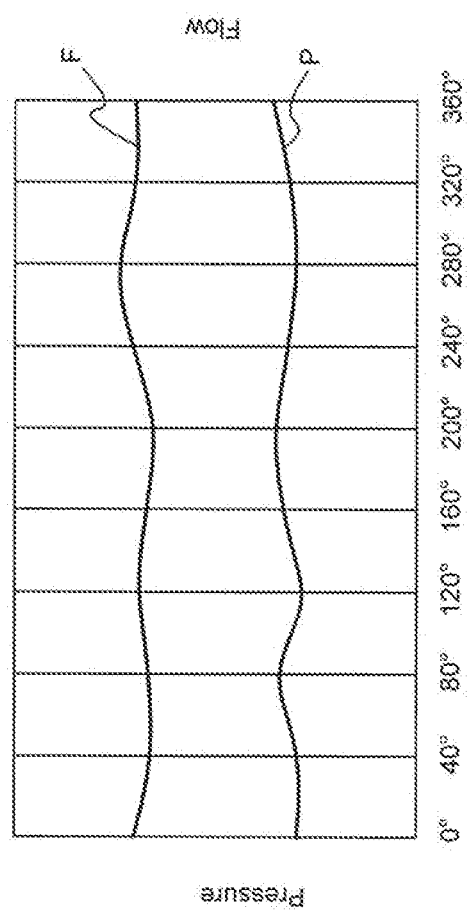
FIG. 4B is a graph showing the mass flow rate distribution and the static pressure distribution of the cooling air in the cooling air chamber of the engine of FIG. 4A.

In operation, cooling air flows from the cooling air source through the inlet tubes 1, 2, and 3 and into the cooling air chamber 330. The cooling air then flows from the cooling air chamber 330 through the conduits 320a-320i and into the turbine chamber 340. The cooling air may cool the nozzle guide vanes as it flows through the conduits 320a-320i and then cools the components in the turbine chamber 340. FIG. 4B is a graph showing the mass flow rate distribution (curve F) and the static pressure distribution (curve P) of the cooling air in the cooling air chamber 330 relative to the circumferential angle about the axis A. The mass flow rate and the static pressure are substantially uniform.

Figure 5A:
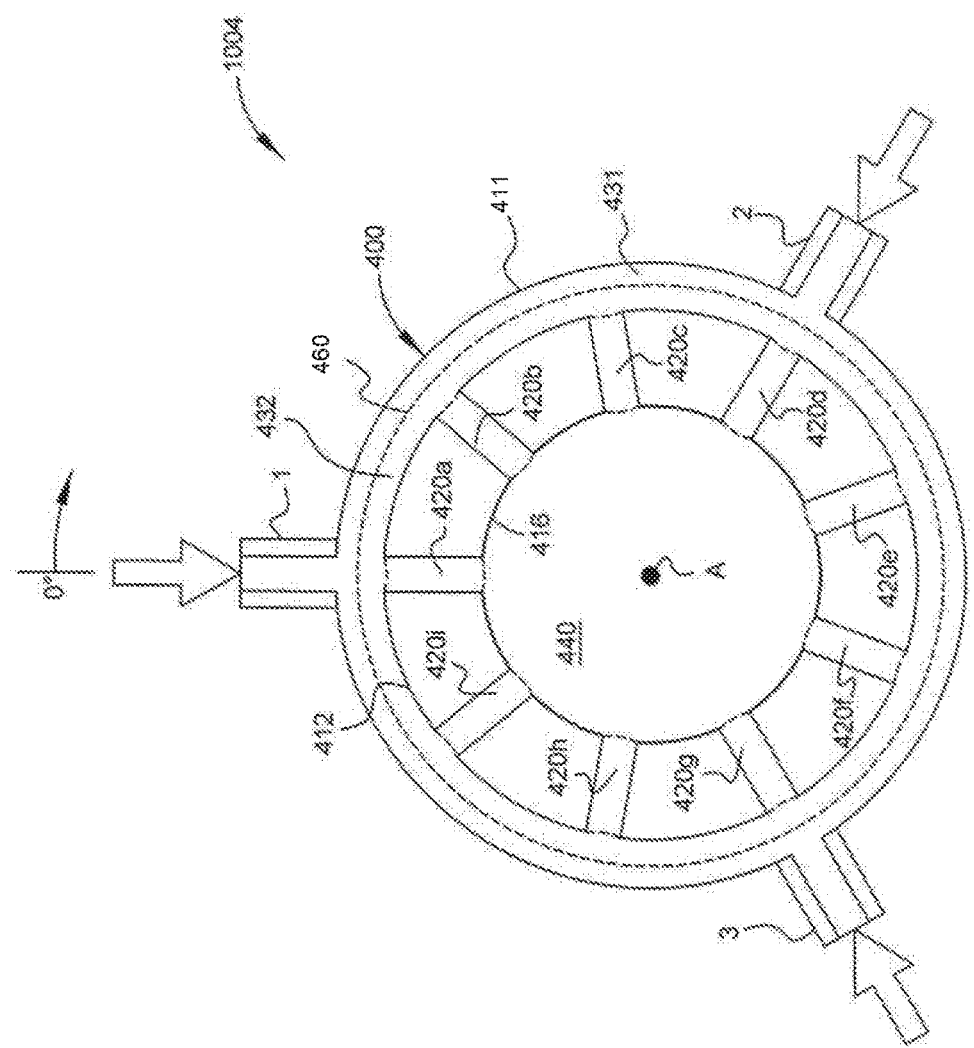
FIG. 5A is a simplified cross-sectional view of another example embodiment of a gas turbine engine of the present disclosure.

FIG. 5A shows a simplified cross-sectional view of a turbofan gas turbine engine 1004 taken along a plane perpendicular to the axis A through a nozzle guide vane assembly between a high-pressure turbine and an intermediate-pressure turbine. The engine 1004 includes a manifold 430 including a cylindrical perforated wall 460 separating the manifold into a first and second cooling air chamber 431 and 432 respectively. The turbine section casing 400 includes an outer cylindrical wall 411 and an inner cylindrical wall 412 radially inward of the outer wall 411. The wall 460 of the manifold 430 and the outer wall 411 of the turbine section casing 400 define a first cooling air chamber 431 there between. The wall 460 and the inner wall 412 of the turbine section casing 400 define a second cooling air chamber 432 there between. An inner flow path boundary wall 416 and inner cylindrical wall 412 define the inner and outer boundaries of the working fluid flow path, respectively. The inner flow path boundary wall 416 defines a turbine chamber 440. Multiple conduits 420a-420i (though any suitable quantity of conduits may be employed) are circumferentially arranged around the turbine chamber 440 and about the axis A and extend radially inwardly from respective conduit inlets on the inner cylindrical wall 412 in fluid communication with the second cooling fluid chamber 430 to respective conduit outlets on the inner flow path boundary wall 416 in fluid communication with the turbine chamber 440. The conduits 420a-420i are defined through nozzle guide vanes (not shown) of the nozzle guide vane assembly.

The perforated wall 460 of the turbine section casing 400 defines multiple openings there through such that when the cooling air is flowing the first and second cooling fluid chambers 431 and 432 are in fluid communication with one another. The first cooling fluid chamber 431 is fluidically connectable to a cooling fluid source (such as the compressor stage of the engine 1004) via inlet tubes 1, 2, and 3 (though any suitable quantity of inlet tubes may be employed). The inlet tubes 1, 2, and 3 are circumferentially spaced about the axis A.

The openings in the perforated wall are sized, shaped, and positioned to increase the static pressure in the first cooling fluid chamber 431 as well as in the second cooling fluid chamber 432 such that the static pressure within the second cooling fluid chamber 432 is substantially uniform and such that the mass flow rates of cooling air through the conduits 420a-420i and into the turbine chamber 440 are substantially uniform. For instance, openings close to the inlet tubes have smaller cross-sectional areas than openings relatively far from the inlet tubes. Alternatively, the openings may be uniform but smaller such that the increase in static pressure on the first cooling chamber 431 serves to distribute the cooling air more uniformly into the second cooling chamber 432.

Figure 5B:
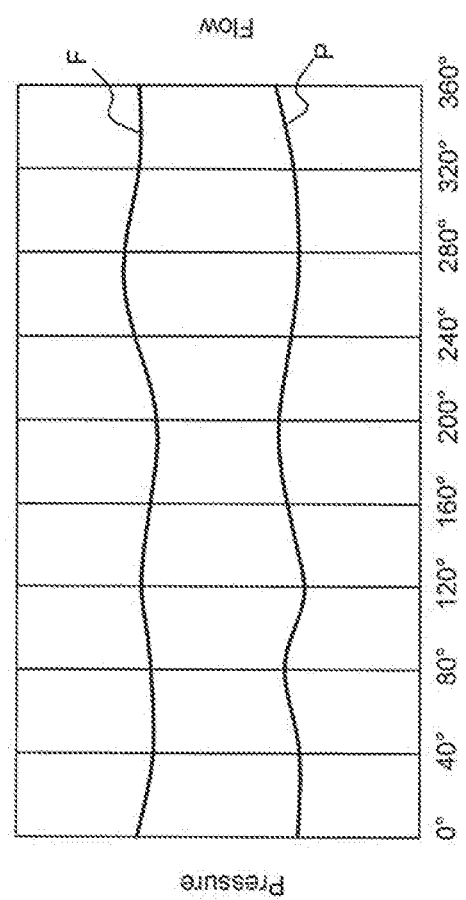
FIG. 5B is a graph showing the mass flow rate distribution and the static pressure distribution of the cooling air in the cooling air chamber of the engine of FIG. 5A.

In operation, cooling air flows from the cooling air source through the inlet tubes 1, 2, and 3 and into the first cooling air chamber 431. The cooling air then flows through the openings in the perforated wall 460 into the second cooling air chamber 432. The cooling air flows from the second cooling air chamber 432 into the conduits 420a-420i and through the conduits 420a-420i into the turbine chamber 440. The cooling air may cool the nozzle guide vanes as it flows through the conduits 420a-420i and then cools the components in the turbine chamber 440. FIG. 5B is a graph showing the mass flow rate distribution (curve F) and the static pressure distribution (curve P) of the cooling air in the second cooling air chamber 430 relative to the circumferential angle about the axis A. The mass flow rate and the static pressure are substantially uniform.

Other embodiments employ a combination of the above embodiments—such as flow restrictors in combination with differently-sized conduits—such that the static pressure within the cooling fluid chamber is substantially uniform and such that the mass flow rates of cooling air through the conduits and into the turbine chamber 440 are substantially uniform.

An aspect of the disclosed subject matter includes, a turbine engine cooling system which defines a cooling air flow path from a cooling air source through an inlet into a manifold defined by the turbine casing and through a plurality of conduits extending radially inward from the manifold to a central chamber, where the central chamber defining a high temperature environment. In this turbine cooling system, a method of increasing the static pressure in the manifold to provide uniform flow through the plurality of conduits includes supplying cooling air from the cooling source into the manifold, and impeding flow of the cooling air through at least a first conduit of the plurality of conduits as a function of relative proximity of the first conduit to the inlet, compared to a second conduit of the plurality of conduits, thereby increasing the static pressure in the manifold and providing uniform flow. The method further includes positioning a first flow restrictor at an inlet or outlet of the first conduit to impeded the flow of the cooling air, the. flow restrictor defining an orifice with cross sectional area less than a cross sectional area of the inlet of the first conduit.

Another aspect of the disclosed subject matter is cooling a turbine section of a turbine engine by providing cooling air from a cooling air source into a turbine chamber via a first cooling air chamber, a second cooling air chamber, and multiple conduits fluidically connecting the second cooling air chamber and the turbine chamber. The flow of the cooling air from the first cooling air chamber to the second cooling air chamber is restricted with a baffle separating the first cooling air chamber from the second cooling air chamber. The baffle includes multiple openings sized and positioned such that a substantially uniform static pressure of the cooling air exists within the first cooling air chamber, where at least two of the openings may have different cross-sectional areas. Additional the openings are sized and the baffles are position to restrict the flow of cooling air from the first cooling air chamber to the second cooling air chamber to achieve the substantially the same mass flow rate through each of the multiple conduits.

Various modifications to the embodiments described herein will be apparent to those skilled in the art. These modifications can be made without departing from the spirit and scope of the present disclosure and without diminishing its intended advantages. It is intended that such changes and modifications be covered by the appended claims.

The invention claimed is:

1. A turbine engine comprising:
a cooling air source;
a manifold within a turbine engine casing;
one or more inlets fluidly connecting the cooling air source to the manifold;
a turbine chamber radially displaced from the casing; and
a plurality of conduits circumferentially arranged and extending radially inward from the manifold to the turbine chamber fluidly connecting the manifold with the turbine chamber, each of the plurality of conduits having a conduit inlet at the manifold and a conduit outlet at the turbine chamber,
wherein a first passage defined at least in part by a first conduit of the plurality of conduits is restricted relative to a second passage defined at least in part by a second conduit of the plurality of conduits as a function of a respective proximity of the first and second conduits to the one or more inlets,
wherein the first passage is restricted relative to the second passage by a first orifice of the first conduit that is less in cross sectional area than a second orifice of the second conduit and/or by a cross sectional area of the first conduit that is less than a cross sectional area of the second conduit.

2. The turbine engine of claim 1, further comprising multiple nozzle guide vanes circumferentially arranged and extending radially inwardly from the turbine engine casing to a boundary of the turbine chamber, wherein the plurality of conduits are positioned through the multiple nozzle guide vanes.

3. The turbine engine of claim 1, wherein the first conduit is positioned a first circumferential distance from a first inlet of the one or more inlets and the second conduit is positioned a second circumferential distance from the first inlet, wherein the second circumferential distance is greater than the first circumferential distance, and wherein a flow of cooling fluid through the first passage is restricted more than a flow of cooling fluid through the second passage.

4. The turbine engine of claim 1, wherein the first passage is defined at least in part by a first flow restrictor positioned radially outward of the conduit inlet of the first conduit, the first flow restrictor defining the orifice with a cross sectional area less than a cross sectional area of the conduit inlet of the first conduit.

5. The turbine engine of claim 4, wherein the orifice is a first orifice, and wherein the second passage is defined at least in part by a second flow restrictor positioned radially outward of the conduit inlet of the second conduit, the second flow restrictor configured to define a second orifice with a cross sectional area less than or equal to a cross sectional area of the conduit inlet of the second conduit and the cross sectional area of the second orifice of the second flow restrictor being greater than the cross sectional area of the first orifice of the first flow restrictor.

6. The turbine engine of claim 4, wherein the first flow restrictor is within the manifold.

7. The turbine engine of claim 1, wherein the orifice is a plurality of orifices, the turbine engine further comprising additional passages, wherein each of the additional passages is defined at least in part by a respective one of the plurality of conduits and is further defined by a flow restrictor positioned radially inward of the respective conduit inlet, each of the respective flow restrictors defining a respective one of the orifices, wherein adjacent flow restrictors define respective orifices of different cross sectional areas.

8. The turbine engine of claim 1, wherein the first passage is defined at least in part by a first flow restrictor positioned radially inward of the conduit outlet of the first conduit, the first flow restrictor defining the orifice with a cross sectional area less than a cross sectional area of the conduit outlet of the first conduit.

9. The turbine engine of claim 8, wherein the orifice is a first orifice, and wherein the second passage defined at least in part by a second flow restrictor positioned radially inward of the conduit outlet of the second conduit, the second flow restrictor defining a second orifice with a cross sectional area less than or equal to a cross sectional area of the conduit inlet of the second conduit and the cross sectional area of the second orifice of the second flow restrictor being greater than the cross sectional area of the first orifice of the first flow restrictor.

10. The turbine engine of claim 8, wherein the first flow restrictor is within the turbine chamber.

11. The turbine engine of claim 1, wherein the orifice is a plurality of orifices, the turbine engine further comprising additional passages, wherein each of the additional passages is defined at least in part by a respective one of the plurality of conduits and is further defined by a flow restrictor positioned radially inward of a respective conduit outlet, each of the respective flow restrictors defining a respective one of the orifices, wherein adjacent flow restrictors have respective orifices of different cross sectional areas.

12. The turbine engine of claim 1, wherein the first passage has a cross sectional area less than a cross sectional area of the second passage, and the first conduit is positioned a first circumferential distance from a first one of the inlets and the second conduit is positioned a second circumferential distance from the first one of the inlets, wherein the second circumferential distance is greater than the first circumferential distance.

13. The turbine engine of claim 1, wherein a number of conduits is not divisible by a number of inlets.

14. The turbine engine of claim 1, further comprising a shaft, rotor disc or bearing, the shaft, rotor or bearing positioned within the turbine chamber.

15. A turbine engine comprising:
a cooling air source;
a manifold defined within a turbine engine casing;
one or more inlets fluidly connecting the cooling air source to the manifold;
a turbine chamber radially displaced from the turbine engine casing; and
a plurality of conduits circumferentially arranged and extending radially inward from the manifold to the turbine chamber, wherein the turbine chamber is radially inward from the plurality of conduits, the plurality of conduits configured to fluidly connect the manifold with the turbine chamber,
wherein each one of the plurality of conduits includes a conduit inlet and a conduit outlet, wherein the conduit inlet of a corresponding one of the conduits is coupled to the manifold and the conduit outlet of a corresponding one of the conduits is coupled to the turbine chamber,
wherein the manifold includes a cylindrical baffle defining a first chamber and second chamber, the first chamber in direct fluid communication with the one or more inlets and the second chamber in direct fluid communication with the plurality of conduits,
wherein the manifold, the baffle, the one or more inlets, and the conduits are configured so that cooling air supplied via the one or more inlets flows from the first chamber to the second chamber through the baffle, through the conduit inlet of each one of the conduits, through the plurality of conduits, through the conduit outlet of each one of the corresponding one of the conduits, and into the turbine chamber, wherein the baffle restricts flow from the first chamber to the second chamber.

16. The turbine engine of claim 15, wherein the baffle comprises a ring having a first surface defining a boundary of the first chamber and a second surface defining a boundary of the second chamber, the ring defining a plurality of orifices extending from the first surface to the second surface, the first and second chambers in fluid communication via the plurality of orifices.

17. The turbine engine of claim 16, wherein a size and a distribution of the plurality of orifices on segments of the baffle are a function of a proximity of a respective segment to the one or more inlets.

18. The turbine engine of claim 17, wherein the size or the distribution density of the orifices on the segments of the baffle which are proximate to the one or more inlets, is less than the size or the distribution density on other segments of the baffle that are farther away from the one or more inlets.

19. The turbine engine of claim 17, wherein the baffle further comprises a plurality of ridges extending from the baffle into the first chamber for impeding a flow of cooling air.

20. In a turbine engine cooling system defining a cooling air flow path from a cooling air source through an inlet into a manifold defined by a turbine casing and through a plurality of conduits extending radially inward from the manifold to a central chamber, wherein the central chamber defines a high temperature environment, a method of increasing a static pressure in the manifold to provide uniform flow through the plurality of conduits comprising;
supplying cooling air from a cooling source into the manifold,
impeding a flow of the cooling air through at least a first conduit of the plurality of conduits as a function of relative proximity of the first conduit to the inlet, compared to a second conduit of the plurality of conduits, thereby increasing the static pressure in the manifold and providing uniform flow
wherein the flow is impeded as a function of relative proximity to the inlet by a first orifice of the first conduit that is less in cross sectional area than a second orifice of the second conduit and/or by a cross sectional area of the first conduit that is less than a cross sectional area of the second conduit.

* * * * *